(12) United States Patent
Buchanan et al.

(10) Patent No.: US 8,387,476 B2
(45) Date of Patent: Mar. 5, 2013

(54) HYDRAULIC ACTUATION VALVE ARRANGEMENT FOR DUAL CLUTCH TRANSMISSION

(75) Inventors: Mark Buchanan, Rochester Hills, MI (US); Melissa Koenig, Howell, MI (US); Christophe Laurent, Lake Orion, MI (US)

(73) Assignee: BorgWarner Inc., Auburn Hills, MI (US)

( * ) Notice: Subject to any disclaimer, the term of this patent is extended or adjusted under 35 U.S.C. 154(b) by 787 days.

(21) Appl. No.: 12/528,530

(22) PCT Filed: Feb. 29, 2008

(86) PCT No.: PCT/US2008/002687
§ 371 (c)(1),
(2), (4) Date: Aug. 25, 2009

(87) PCT Pub. No.: WO2008/108977
PCT Pub. Date: Sep. 12, 2008

(65) Prior Publication Data
US 2010/0096232 A1 Apr. 22, 2010

Related U.S. Application Data

(60) Provisional application No. 60/904,698, filed on Mar. 2, 2007.

(51) Int. Cl.
*F16H 59/00* (2006.01)
*F16H 61/00* (2006.01)
*F16H 63/00* (2006.01)

(52) U.S. Cl. ....................................... 74/335

(58) Field of Classification Search ............ 74/330, 74/331, 335, 340; 192/3.51, 3.54, 3.57, 3.61; 477/130, 131
See application file for complete search history.

(56) References Cited

U.S. PATENT DOCUMENTS 3,589,483 A 6/1971 Smith
4,461,188 A 7/1984 Fisher
4,476,748 A 10/1984 Morscheck
(Continued)

OTHER PUBLICATIONS

PCT International Search Report for International Application No. PCT/US2008/002687; 3 pages.

*Primary Examiner* — Troy Chambers
*Assistant Examiner* — Michael Gonzalez
(74) *Attorney, Agent, or Firm* — Warn Partners, P.C.

(57) ABSTRACT

A control system is provided for a multiple clutch transmission (10) having at least three synchronizers (74, 76, 78, 80) with opposed acting alpha and beta pressure chambers (106, 104) to selectively synchronize alpha or beta gears with a rotating shaft. The control system includes a pressure source (124), a sump (120), a first multiplex valve (160) having a first position allowing fluid communication of alpha and beta chambers for two synchronizers (74, 76) with the pressure source (122) and diverting alpha and beta pressure chambers (106, 104) of remaining synchronizers (80, 78) to sump (120). The first multiplex valve (160) has a second position reversing the above action. A second multiplex valve (164) connected with the first multiplex valve (160) having a first position connecting alpha and beta chambers (106, 104) of a given synchronizer with the pressure source (122) and alpha and beta chambers (106, 104) of the other synchronizer with the sump (120). The second multiplex valve (164) has a second position reversing the action. A first regulator valve (170) is connected with the second multiplex valve (164) for selectively connecting the alpha chamber (106) with one of a set of the pressure source (122) and the sump (120). A second regulator valve is provided connected with the second multiplex valve (164) for selectively connecting the beta chamber (104) with one of a set of the pressure source (122) and the sump 120).

14 Claims, 3 Drawing Sheets

U.S. PATENT DOCUMENTS

| | | | |
|---|---|---|---|
| 4,513,631 A | 4/1985 | Koivunen | |
| 4,544,057 A | 10/1985 | Webster et al. | |
| 4,622,866 A | 11/1986 | Ito et al. | |
| 4,711,329 A * | 12/1987 | Hasegawa et al. | 192/3.57 |
| 4,827,784 A | 5/1989 | Muller et al. | |
| 4,957,016 A * | 9/1990 | Amedei et al. | 74/336 R |
| 5,101,942 A * | 4/1992 | Pruss et al. | 192/3.58 |
| 5,239,897 A * | 8/1993 | Zaiser et al. | 74/335 |
| 5,445,042 A * | 8/1995 | Deady | 74/329 |
| 5,445,043 A | 8/1995 | Eaton et al. | |
| 5,486,146 A | 1/1996 | Asahara et al. | |
| 5,588,327 A * | 12/1996 | Downs et al. | 74/335 |
| 5,662,198 A | 9/1997 | Kojima et al. | |
| 5,711,409 A | 1/1998 | Murata | |
| 5,720,203 A | 2/1998 | Honda et al. | |
| 5,890,392 A | 4/1999 | Ludanek et al. | |
| 5,915,512 A | 6/1999 | Adamis et al. | |
| 5,950,781 A | 9/1999 | Adamis et al. | |
| 5,966,989 A | 10/1999 | Reed, Jr. et al. | |
| 5,979,257 A | 11/1999 | Lawrie | |
| 6,006,620 A | 12/1999 | Lawrie et al. | |
| 6,012,561 A | 1/2000 | Reed, Jr. et al. | |
| 6,044,719 A | 4/2000 | Reed, Jr. et al. | |
| 6,145,398 A | 11/2000 | Bansbach et al. | |
| 6,164,149 A | 12/2000 | Ohmori et al. | |
| 6,286,381 B1 | 9/2001 | Reed, Jr. et al. | |
| 6,292,731 B1 | 9/2001 | Kirchhoffer et al. | |
| 6,364,809 B1 | 4/2002 | Cherry | |
| 6,832,978 B2 | 12/2004 | Buchanan et al. | |
| 6,883,394 B2 * | 4/2005 | Koenig et al. | 74/335 |
| 6,887,184 B2 | 5/2005 | Buchanan et al. | |
| 6,898,992 B2 * | 5/2005 | Koenig et al. | 74/335 |
| 6,909,955 B2 | 6/2005 | Vukovich et al. | |
| 6,953,417 B2 * | 10/2005 | Koenig | 477/181 |
| 6,996,989 B2 | 2/2006 | Dries et al. | |
| 7,073,407 B2 * | 7/2006 | Stefina | 74/331 |
| 7,127,961 B2 * | 10/2006 | Braford et al. | 74/340 |
| 7,155,993 B2 * | 1/2007 | Koenig et al. | 74/331 |
| 7,431,043 B2 | 10/2008 | Xiang et al. | |

* cited by examiner

HYDRAULIC ACTUATION VALVE ARRANGEMENT FOR DUAL CLUTCH TRANSMISSION

CROSS-REFERENCE TO RELATED APPLICATIONS

This application claims the benefit of U.S. Provisional Application No. 60/904,698, filed 2 Mar. 2007.

FIELD OF THE INVENTION

The present invention relates to control systems for dual clutch transmissions.

BACKGROUND OF THE INVENTION

Examples of dual clutch transmissions are described in U.S. Pat. Nos. 5,711,409; 6,996,989; 6,887,184; 6,909,955; 2006/0101933A1; and 2006/0207655A1. A control system for a dual clutch transmission is shown in Koenig et al., U.S. Pat. No. 6,898,992 (commonly assigned). It is desirable that a control system for a dual clutch transmission prevent simultaneous engagement of synchronized gears. It is also desirable that the control system for a dual clutch transmission offer as much operational capacity as possible when a given component of the control system is non operational.

SUMMARY OF THE INVENTION

To make manifest the above noted and other desires, a revelation of the present invention is brought forth. The present invention in a preferred embodiment provides a control system for a multiple clutch transmission, the transmission having at least three synchronizers with opposed acting alpha and beta pressure chambers to alternately selectively synchronize alpha or beta gears with a rotating shaft. The control system includes a pressure source, a sump, a first multiplex valve having a first position allowing fluid communication of alpha and beta chambers for two synchronizers with the pressure source and diverting alpha and beta pressure chambers of remaining synchronizers to the sump. The first multiplex valve also has a second position reversing the above noted action. A second multiplex valve is included fluidly connected with the first multiplex valve having a first position connecting alpha and beta chambers of a given synchronizer with the pressure source and alpha and beta chambers of the other synchronizer with the sump. The second multiplex valve also has a second position reversing the above noted action. A first actuator regulator valve is included fluidly connected with the second multiplex valve for selectively connecting said alpha chamber with one of a set including the pressure source and the sump. A second actuator regulator valve is included fluidly connected with the second multiplex valve for selectively connecting said beta chamber with one of a set including the pressure source and the sump.

Other features of the invention will become more apparent to those skilled in the art as the invention is further revealed in the accompanying drawings and Detailed Description of the Invention.

DETAILED DESCRIPTION OF THE INVENTION

Figure 1:
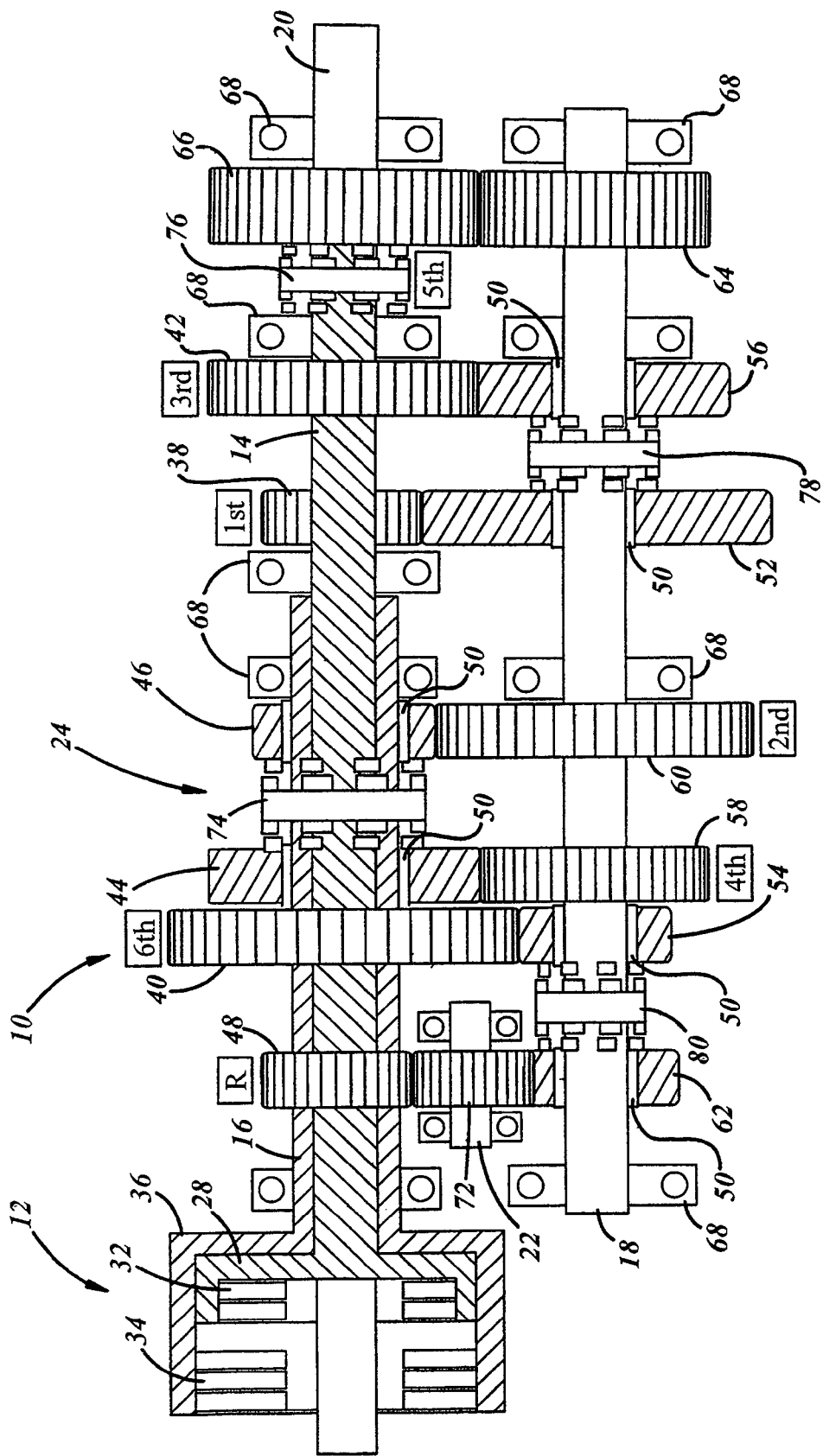
FIG. 1 is schematic view of a dual clutch transmission.
Figure 2:
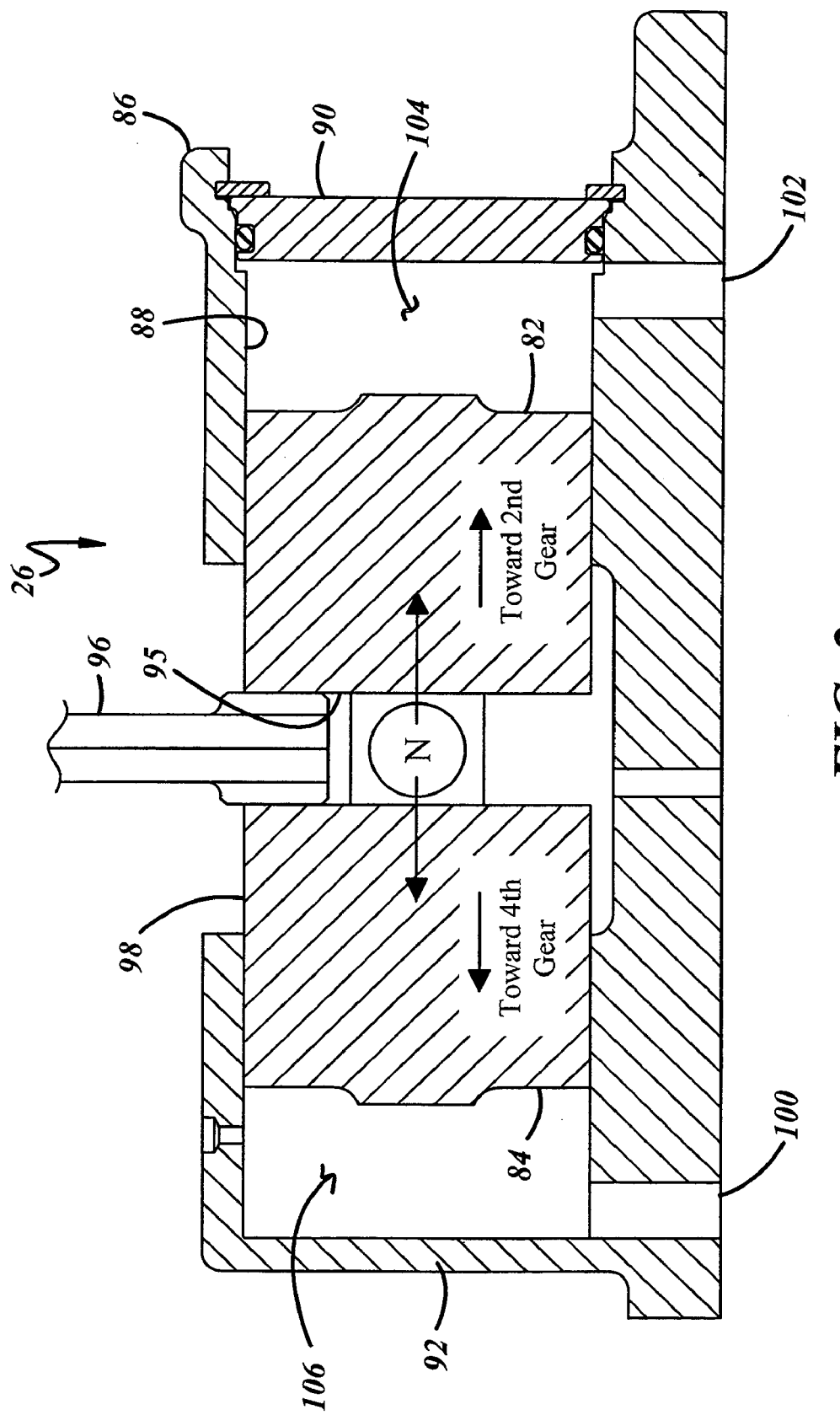
FIG. 2 is a sectioned view of an actuator for a synchronizer utilized in the dual clutch transmission of FIG. 1.

A representative dual clutch transmission that may be controlled by the present invention is generally indicated at 10 in the schematic illustrated in FIG. 1. Specifically, as shown in FIG. 1, the dual clutch transmission 10 includes a dual, coaxial clutch assembly generally indicated at 12, a first input shaft, generally indicated at 14, a second input shaft, generally indicated at 16, that is coaxial to the first, a counter shaft, generally indicated at 18, an output shaft 20, a reverse counter shaft 22, a plurality of synchronizers, generally indicated at 24, and a plurality of shift actuators generally indicated at 26 (FIG. 2).

The dual clutch transmission 10 forms a portion of a vehicle powertrain and is responsible for taking a torque input from a prime mover, such as an internal combustion engine, and transmitting the torque through selectable gear ratios to the vehicle drive wheels. The dual clutch transmission 10 operatively routes the applied torque from the engine through the dual, coaxial clutch assembly 12 to either the first input shaft 14 or the second input shaft 16. The input shafts 14 and 16 include a first series of gears, which are in constant mesh with a second series of gears disposed on the counter shaft 18. Each one of the first series of gears interacts with one of the second series of gears to provide the different gear ratios sets used for transferring torque. The counter shaft 18 also includes a first output gear that is in constant mesh with a second output gear disposed on the output shaft 20. The plurality of synchronizers 24 are disposed on the two input shafts 14, 16 and on the counter shaft 18 and are operatively controlled by the plurality of shift actuators 26 to selectively engage one of the alternate gear ratio sets. Thus, torque is transferred from the engine to the dual, coaxial clutch assembly 12, to one of the input shafts 14 or 16, to the counter shaft 18 through one of the gear ratio sets, and to the output shaft 20. The output shaft 20 further provides the output torque to the remainder of the powertrain. Additionally, the reverse counter shaft 22 includes an intermediate gear that is disposed between one of the first series of gears and one of the second series of gears, which allows for a reverse rotation of the counter shaft 18 and the output shaft 20. Each of these components will be discussed in greater detail below.

Specifically, the dual, coaxial clutch assembly 12 includes a first clutch mechanism 32 and a second clutch mechanism 34. The first clutch mechanism 32 is, in part, physically connected to a portion of the engine flywheel (not shown) and is, in part, physically attached to the first input shaft 14, such that the first clutch mechanism 32 can operatively and selectively engage or disengage the first input shaft 14 to and from the flywheel. Similarly, the second clutch mechanism 34 is, in part, physically connected to a portion of the flywheel and is, in part, physically attached to the second input shaft 16, such that the second clutch mechanism 34 can operatively and selectively engage or disengage the second input shaft 16 to and from the flywheel. As can be seen from FIG. 1, the first and second clutch mechanisms 32, 34 are coaxial and co-centric such that the outer case 28 of the first clutch mechanism 32 fits inside of the outer case 36 of the second clutch mechanism 34. Similarly, the first and second input shafts 14, 16 are also coaxial and co-centric such that the second input shaft 16 is hollow having an inside diameter sufficient to allow the first input shaft 14 to pass through and be partially supported by the second input shaft 16. The first input shaft 14 includes a first input gear 38 and a third input gear 42. The first input shaft 14 is longer in length than the second input shaft 16 so that the first input gear 38 and a third input gear 42 are disposed on the portion of the first input shaft 14 that extends beyond the second input shaft 16. The second input shaft 16 includes a sixth input gear 40, a fourth input gear 44, a second input gear 46, and a reverse input gear 48. As shown in FIG. 1, the sixth input gear 40 and the reverse input gear 48 are fixedly supported on the second input shaft 16 and the fourth input gear 44 and second input gear 46 are rotatably supported about the second input shaft 16 upon bearing assemblies 50 so that their rotation is unrestrained unless the accompanying synchronizer is engaged, as will be discussed in greater detail below.

In the preferred embodiment, the counter shaft 18 is a single, one-piece shaft that includes the opposing, or counter, gears to those on the inputs shafts 14, 16. As shown in FIG. 1, the counter shaft 18 includes a first counter gear 52, a sixth counter gear 54, a third counter gear 56, a fourth counter gear 58, a second counter gear 60, and a reverse counter gear 62. The counter shaft 18 fixedly retains the fourth counter gear 58 and second counter gear 60, while first, sixth, third, and reverse counter gears 52, 54, 56, 62 are supported about the counter shaft 18 by bearing assemblies 50 so that their rotation is unrestrained unless the accompanying synchronizer is engaged as will be discussed in greater detail below. The counter shaft 18 also fixedly retains a first drive gear 64 that meshingly engages the corresponding second driven gear 66 on the output shaft 20. The second driven gear 66 is fixedly mounted on the output shaft 20. The output shaft 20 extends outward from the transmission 10 to provide an attachment for the remainder of the powertrain.

In a preferred embodiment, the reverse counter shaft 22 is a relatively short shaft having a single reverse intermediate gear 72 that is disposed between, and meshingly engaged with, the reverse input gear 48 on the second input shaft 16 and the reverse counter gear 62 on the counter shaft 18. Thus, when the reverse gears 48, 62, and 72 are engaged, the reverse intermediate gear 72 on the reverse counter shaft 22 causes the counter shaft 18 to turn in the opposite rotational direction from the forward gears thereby providing a reverse rotation of the output shaft 20. It should be appreciated that all of the shafts of the dual clutch transmission 10 are disposed and rotationally secured within the transmission 10 by some manner of bearing assembly such as roller bearings, for example, shown at 68 in FIG. 1.

The engagement and disengagement of the various forward and reverse gears is accomplished by the actuation of the synchronizers 24 within the transmission. As shown in FIG. 1 in this example of a dual clutch transmission 10, four synchronizers 74, 76, 78, and 80 are utilized to shift through the six forward gears and reverse. It should be appreciated that there are a variety of known types of synchronizers that are capable of engaging a gear to a shaft and that the particular type employed for the purposes of this discussion is beyond the scope of the present invention. Generally speaking, any type of synchronizer that is movable by a shift fork or like device may be employed. As shown in the representative example of FIG. 1, the synchronizers are two sided, dual actuated synchronizers, such that they engage one gear to its respective shaft when moved off a center neutralized position to the right and engage another gear to its respective shaft when moved to the left. Specifically with reference to FIG. 1, synchronizer 78 can be actuated to the left to engage the first counter gear 52 on the counter shaft 18 or actuated to the right to engage the third counter gear 56. Synchronizer 80 can be actuated to the left to engage the reverse counter gear 62 or actuated to the right to engage the sixth counter gear 54.

Likewise, synchronizer 74 can be actuated to the left to engage the fourth input gear 44 or actuated to the right to engage the second input gear 46. Synchronizer 76 is actuated to the right to directly engage the end of the first input shaft 14 to the output shaft 20 thereby providing a direct 1:1 (one to one) drive ratio for fifth gear. There is no gear set to engage to the left of synchronizer 76.

To actuate the synchronizers 74, 76, 78, and 80, this representative example of a dual clutch transmission 10 utilizes hydraulically driven shift actuators 26 with attached shift forks to selectively move the synchronizers so that they engage or disengage (neutralize) the desired gears. As shown in FIG. 2, the shift actuators 26 are essentially two way or dual hydraulic valve assemblies that are driven back and forth linearly, in parallel to one of the input shafts 14, 16 or the counter shaft 18, to move a shift fork 96, and ultimately one of the plurality of synchronizers 24 in and out of engagement. It should be appreciated from the description that follows that other types of actuators that are capable of driving a shift fork back and forth to move a synchronizer may also be employed with the method of the present invention. These include mechanical actuators, hydro-mechanical actuators, electro-mechanical actuators, electrical actuators, and the like.

Referring to FIG. 2, the hydraulically operated shift actuators 26 include an outer case 86 that includes a main bore 88 having two cylindrically shaped ends 90, 92. A piston 98 is slidably disposed within the main bore 88 of the case 86. The piston 98 includes two opposing sealed heads 82 and 84. The interaction of each piston head 82 and 84 within its respective cylinder end 90, 92 forms alpha and beta pressure or expansion chambers 106, 104.

Between the piston heads 82 and 84 is a gap. Positioned within the gap 95 is the shift fork 96. To actuate the synchronize 74 to the right to actuate the second gear ratio, fluid is injected into alpha expansion chamber 106 through inlet-outlet 100 to move the piston and shift fork 96 to the right causing synchronizer 80 to engage the second input gear 46 to the shaft 16. A detent mechanism (not shown) connected with the linkage with the shift fork 96 holds the shift fork 96 in to hold its actuated position. To release the second input gear 46 from its shaft 16, the beta expansion chamber 104 is pressurized through inlet 102 and the piston 98 and shift fork 96 are shifted back to a detented neutral position. A slight pressurization of the expansion chamber 106 is temporarily maintained to prevent overtravel of the piston 98 and inadvertent engagement of fourth input gear 44 to the shaft 16.

Figure 3:
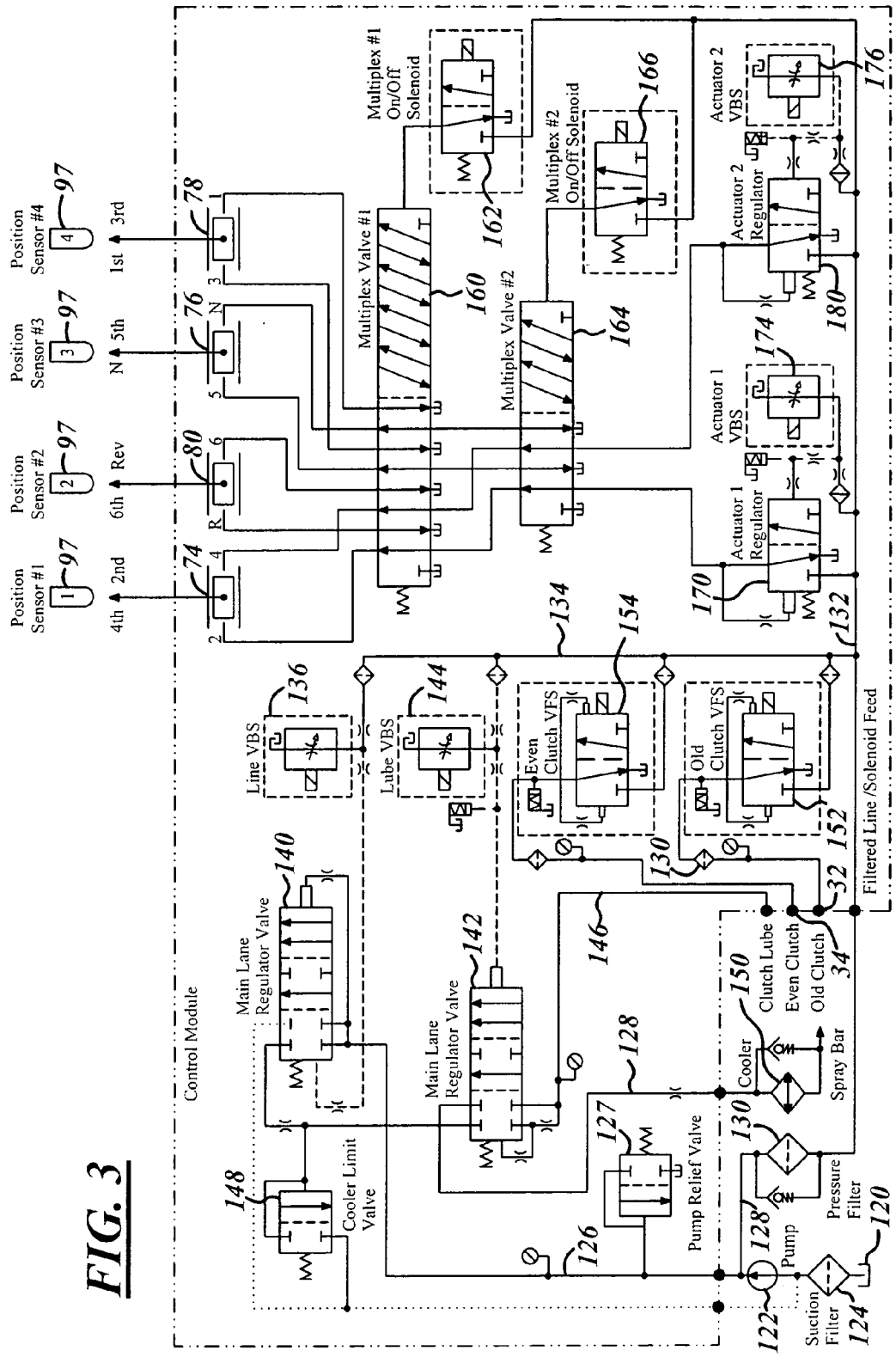
FIG. 3 is a hydraulic schematic of a control system of the present invention.

FIG. 3 illustrates a hydraulic control system for the first and second clutches 32, 34 and for synchronizers 74, 76, 78 and 80. The control system 7 has an oil sump 120. To provide a source of pressurize oil or fluid, a pump 122 is connected to the sump 120 via a suction filter 124. The pump 122 delivers pressurized fluid to lines 126 and 128. A pump relief valve 127 connected to line 126 prevents over pressurization in line 126. Fluid in line 128 passes through pressure filter 130 into lines 132 and 134. The line 134 is connected with a variable bleed solenoid (VBS.) 136. The VBS 136 controls operation of a main line pressure regulator valve 140. When at least partially actuated by VBS 136, the valve 140 connects line 126 with a lube regulator valve 142. A VBS 144 controls valve 142 to control lubrication of the clutches 32, 34 via a clutch lube line 146. Clutch lube line 146 is connected with the clutch lubrication system. Valve 140 is also fluidly connected with an oil cooler limit valve 148. An outlet of the valve 148 is looped back to in inlet side of the pump 122. Valve 142 additionally delivers fluid to oil cooler 150. Variable force solenoids (VFS) 152, 154 control the pressure within their respective clutches 32 and 34 by selectively communicating to the clutches with the line 134 or with the sump 120.

The control system for the synchronizers includes a first multiplex valve 160. The first multiplex valve 160 has a first position allowing delivery of pressurize fluid to synchronizers 74 and 76. Synchronizers 78 and 80 are diverted to the sump 120. In a second position of the first multiplex valve 160 the reverse occurs allowing delivery of pressurize fluid to synchronizers 78 and 80 with synchronizers 74 and 76 being diverted to the sump. An on/off solenoid valve 162 controls operation of the first multiplex valve 160.

A second multiplex valve 164 is fluidly connected with the first multiplex valve 160. The second multiplex valve 164 has a first position allowing pressurized fluid connection of alpha and beta chambers of the synchronizer 74 (when the first multiplex valve 160 is in the first position). The alpha and beta chambers of synchronizer 76 are diverted to the sump 120. When the second multiplex valve 164 is placed in the second position by an on/off solenoid 166, the fluid connections of the second multiplex valve 164 are reversed. The alpha chambers for the synchronizers 74, 76, 78, and 80 include pressure chambers for odd and even gear ratios.

To actuate the alpha chamber there is provided a first actuator regulator valve 170. First actuator regulator valve 170 has a biased position connecting the alpha chamber to the sump 120. In a second position, the first actuator regulator valve 170 connects the alpha chamber with the line 132. A proportional solenoid valve provided by VBS solenoid valve 174 controls the first actuator regulator valve 170. In like manner, VBS 176 controls the second actuator regulator valve 180 for the beta chamber of the synchronizer 74.

To control the synchronizer 76 the first multiplex valve 160 is in the first position and the second multiplex valve is placed in the second position. To control synchronizer 80 or synchronizer 78 the first multiplex valve 160 is placed in the second position. For synchronizer 80, the second multiplex valve 164 is in the first position. For control of the synchronizer 78, the second multiplex valve 164 is placed in the second position.

To place the second input gear 46 into engagement with the shaft 16, the first multiplex valve 160 and second multiplex valve 162 are placed in the first position. The first regulator valve 170 is turned on to pressurize the alpha expansion chamber 106 moving the piston 98 and shift fork 96 to the right. A position sensor 97 is used to inform or confirm the fact to the transmission electronic controller (not shown) that the transmission 10 is in the second gear. A major advantage of the present control system for the synchronizers is that no two gears of the transmission can be actuated at the same time. If the second input gear 46 is being actuated, all of the pressure chambers of the synchronizers 80, 78 and 76 are diverted to the sump. If a control system failure causes the second actuator regulator valve 180 to pressurize the beta expansion chamber 104 of the shift actuator 26 for synchronizer 74, the pressure within the opposing beta 104 and alpha 106 expansion chambers act against each preventing any simultaneous gear activation (however when the alpha chamber 106 is depressurized the above noted failure causes the gear (fourth input gear 44) associated with the beta chamber to be stuck on). Another advantage of the present control system is that most valve failures allow at least one odd gear and at least one even gear to still operate. Failure of the first multiplex valve 160 in the first position allows operation of synchronizer 74 providing second and fourth gears. Additionally, fifth and neutral gears of synchronizer 76 are available. Upon such a failure, the transmission controller programs the transmission 10 to operate in second, fourth and fifth gear ratios dependent upon vehicle speed in a "limp" home mode of operation.

A failure of the first multiplex valve 160 in the second position still allows for operation of the reverse, six gear, third gear and first. Failure of the second multiplex valve 164 in the first position will still allow operation of the second, fourth, sixth and reverse gears. Failure of any one given actuator valve still allows for partial gear operation. Failure of the actuator regulator valve 170 in the on position will freeze (be detented) second input gear 46 with the shaft 16. To get another gear for "limp" home operation, the transmission controller opens the clutch 34. Engaged clutch 32 is utilized to rotate the shaft 14. The controller of the transmission then picks a gear ratio from a set of gear ratios associated with the shafts 14 or 20 (first, third or fifth) gear to be utilized for "limp" home mode of operation. The transmission controller then alternates between second and one gear from the set of first, third or fifth gear. As long as a forward travel gear is engaged when one of the actuator regulator valves 170, 180 fails, the transmission will have two gear ratios of forward operation in the "limp" home mode of operation.

Still another advantage of the present invention over other control systems as shown in Koenig et al. U.S. Pat. No. 6,898,992 (commonly assigned) is that only two high flow rate solenoid actuator regulator valves 170, 180 are required.

While preferred embodiments of the present invention have been disclosed, it is to be understood it has been described by way of example only, and various modifications can be made without departing from the spirit and scope of the invention as it is encompassed in the following claims.

What is claimed is:

1. A control system for a multiple clutch transmission, said transmission having at least three synchronizers, each synchronizer having an alpha pressure chamber and a beta pressure chamber opposed to said alpha chamber to alternately selectively synchronize an alpha gear or a beta gear with a rotating shaft, said control system comprising:
   a pressure source;
   a sump;
   a first multiplex valve having a first position allowing fluid communication of alpha and beta chambers for two synchronizers with said pressure source and diverting alpha and beta pressure chambers of remaining synchronizers to said sump, said first multiplex valve having a second position reversing the immediately noted above action;
   a second multiplex valve fluidly connected with said first multiplex valve having a first position connecting alpha and beta chambers of a selected synchronizer with said pressure source and alpha and beta chambers of a non-selected synchronizer with said sump, said second multiplex valve having a second position reversing the immediately noted above action;
   a first actuator regulator valve fluidly connected with said second multiplex valve for selectively connecting said alpha chamber of said selected synchronizer with one of said pressure source and said sump; and
   a second actuator regulator valve fluidly connected with said second multiplex valve for selectively connecting said beta chamber of said selected synchronizer with one of said pressure source and said sump.

2. A control system as described in claim 1 wherein at least one of said actuator regulator valves is controlled by a proportional solenoid valve.

3. A control system as described in claim 1 wherein at least one of said actuator regulator valves is controlled by a variable bleed solenoid valve.

4. A control system as described in claim 1 wherein at least one of said actuator regulator valves is biased to connect said chamber to a sump.

5. A control system as described in claim 1 wherein at least one of said multiplex valves is controlled by an on/off solenoid valve.

6. A control system as described in claim 1 wherein said alpha chambers include pressure chambers for even and odd gear ratios.

7. A control system as described in claim 6 where upon a failure of said first multiplex valve said control system can still operate at least one even gear ratio and one odd gear ratio.

8. A control system as described in claim 6 where upon failure of said second multiplex valve said control system can still operate at least one even gear ratio and one odd gear ratio.

9. A control system as described in claim 6 wherein upon failure of one of said actuator regulator valves when said control system is operating in forward gear ratio said control system can still operate at least two gear ratios.

10. A multiple clutch transmission comprising:
    at least three synchronizers, each synchronizer having an opposed acting alpha pressure chamber and a beta pressure chamber to alternately selectively synchronize an alpha gear or a beta gear with one or more rotating shafts, said transmission having a control system comprising:
    a pressure source;
    a sump;
    a first multiplex valve having a first position allowing fluid communication of alpha and beta chambers for two synchronizers with said pressure source and diverting alpha and beta pressure chambers of remaining synchronizers to said sump, said first multiplex valve having a second position reversing the immediately noted above action;
    a second multiplex valve fluidly connected with said first multiplex valve having a first position connecting alpha and beta chambers of a selected synchronizer with said pressure source and alpha and beta chambers of a non-selected synchronizer with said sump, said second multiplex valve having a second position reversing the immediately noted above action;
    a first actuator regulator valve fluidly connected with said second multiplex valve for selectively connecting said alpha chamber of said selected synchronizer with one of said pressure source and said sump; and
    a second actuator regulator valve fluidly connected with said second multiplex valve for selectively connecting said beta chamber of said selected synchronizer with one of said pressure source and said sump.

11. A control system as described in claim 10 wherein failure of one of said actuator regulator valves when said control system is operating said in a forward gear ratio, said control system can still operate at least two gear ratios.

12. A multiple clutch transmission as described in claim 10 wherein said alpha chambers include pressure chambers for even and odd gear ratios.

13. A multiple clutch transmission as described in claim 12 where upon a failure of said first multiplex valve said control system can still operate at least one even gear ratio and one odd gear ratio.

14. A multiple clutch transmission as described in claim 12 where upon a failure of said second multiplex valve said control system can still operate at least one even gear ratio and one odd gear ratio.

* * * * *